73809. S. G. Hoyt. Ice Pick.
PATENTED
JAN 28 1868
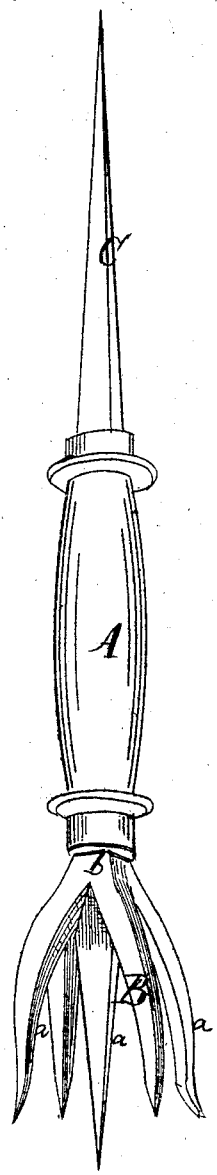
Witnesses.
Inventor:
S G Hoyt
Per Munn & Co
Attorneys

United States Patent Office.

S. GRANT HOYT, OF NEW YORK, N. Y.

Letters Patent No. 73,809, dated January 28, 1868.

IMPROVED ICE-PICK.

*The Schedule referred to in these Letters Patent and making part of the same.*

TO ALL WHOM IT MAY CONCERN:

Be it known that I, S. GRANT HOYT, of the city, county, and State of New York, have invented a new and improved Ice-Pick; and I do hereby declare that the following is a full, clear, and exact description thereof, which will enable others skilled in the art to make and use the same, reference being had to the accompanying drawing, forming part of this specification.

The drawing represents a perspective view of my invention.

This invention relates to a new ice-pick, which is so arranged that it can be used for dividing blocks of ice into smaller pieces, and for separating such small pieces from the block, and also for breaking blocks into minute fragments, which are used to cool beverages in the glass, and for other purposes.

The invention consists in forming a pick which has two or more tines or teeth secured in a suitable handle, and consists also in providing a handle at one end with an ordinary single pick, and at the other end with a pick having a number of teeth.

Such an instrument will be of great convenience for preparing the ice for cool beverages, for ice-cream, and other purposes.

A represents the handle of my improved ice-pick. B represents the tool or pick. The same consists of two or more teeth, *a a*, projecting from one head, *b*, as shown, said head having a suitable shank, by means of which it is fastened into the handle. Two teeth will be very convenient for the aforesaid purpose, but the most perfect instrument will consist of four or more tines, in which one is arranged in the centre, the others being grouped around it, as shown in the drawing, the centre tine being a little longer than the others, as shown. In the other end of the handle A may be secured an ordinary one-toothed pick C, as shown.

I claim as new, and desire to secure by Letters Patent—

An ice-pick consisting of a handle, A, having a many-pointed pick, B, at one end, and a single-pointed pick, C, at the other end, substantially as and for the purpose herein shown and described.

S. GRANT HOYT.

Witnesses:
WM. F. MCNAMARA,
ALEX. F. ROBERTS.